United States Patent
Kawano et al.

(10) Patent No.: US 10,396,667 B2
(45) Date of Patent: Aug. 27, 2019

(54) DC-DC CONVERTER INCLUDING AN INTERMITTENT OVERCURRENT PROTECTION CIRCUIT

(71) Applicant: SII Semiconductor Corporation, Chiba-shi, Chiba (JP)

(72) Inventors: Akihiro Kawano, Chiba (JP); Katsuya Goto, Chiba (JP)

(73) Assignee: ABLIC INC., Chiba (JP)

( * ) Notice: Subject to any disclaimer, the term of this patent is extended or adjusted under 35 U.S.C. 154(b) by 0 days.

(21) Appl. No.: 15/497,613

(22) Filed: Apr. 26, 2017

(65) Prior Publication Data

US 2017/0317592 A1 Nov. 2, 2017

(30) Foreign Application Priority Data

Apr. 28, 2016 (JP) ................. 2016-091198

(51) Int. Cl.
| | |
|---|---|
| H02M 3/158 | (2006.01) |
| H02M 1/08 | (2006.01) |
| H02M 1/32 | (2007.01) |
| H02M 3/156 | (2006.01) |
| H02M 1/00 | (2006.01) |

(52) U.S. Cl.
CPC ........... *H02M 3/1588* (2013.01); *H02M 1/08* (2013.01); *H02M 1/32* (2013.01); *H02M 3/156* (2013.01); *H02M 2001/0009* (2013.01); *H02M 2001/0025* (2013.01); *H02M 2001/0035* (2013.01); *Y02B 70/16* (2013.01)

(58) Field of Classification Search
CPC .......... H02M 3/158; H02M 1/08; H02M 1/32; H02M 2001/0009; H02M 2001/0025
See application file for complete search history.

(56) References Cited

U.S. PATENT DOCUMENTS

| | | | |
|---|---|---|---|
| 6,246,221 B1* | 6/2001 | Xi | G05F 1/575 323/280 |
| 7,379,310 B2 | 5/2008 | Louvel et al. | |
| 7,482,877 B2 | 1/2009 | Kim et al. | |
| 7,940,030 B2 | 5/2011 | Cannella et al. | |
| 2004/0227498 A1* | 11/2004 | Okada | G05F 1/575 323/285 |
| 2005/0078404 A1 | 4/2005 | Kuramoto et al. | |
| 2005/0253568 A1 | 11/2005 | Morimoto | |
| 2009/0034302 A1* | 2/2009 | Cannella | H02M 1/32 363/56.1 |
| 2011/0140636 A1* | 6/2011 | Adams | H02M 3/156 315/302 |
| 2012/0134378 A1* | 5/2012 | Kamatani | G06K 15/1209 372/38.01 |
| 2013/0083562 A1 | 4/2013 | Wu et al. | |
| 2016/0043627 A1 | 2/2016 | Chen et al. | |
| 2017/0187289 A1* | 6/2017 | Fukumoto | H02M 1/08 |

OTHER PUBLICATIONS

Office Action in U.S. Appl. No. 15/497,725, dated Nov. 7, 2017, 8 pages.

* cited by examiner

*Primary Examiner* — Jue Zhang
*Assistant Examiner* — Lakaisha Jackson
(74) *Attorney, Agent, or Firm* — Brinks Gilson & Lione

(57) ABSTRACT

There is provided a DC-DC converter which is safe and secure, but yet with low power consumption. The DC-DC converter is configured such that an overcurrent protection circuit is operated intermittently only for a predetermined period of time based on a signal output from an output control circuit to turn on a switching element.

2 Claims, 5 Drawing Sheets

DC-DC CONVERTER INCLUDING AN INTERMITTENT OVERCURRENT PROTECTION CIRCUIT

RELATED APPLICATIONS

This application claims priority under 35 U.S.C. § 119 to Japanese Patent Application No. 2016-091198 filed on Apr. 28, 2016, the entire content of which is hereby incorporated by reference.

BACKGROUND OF THE INVENTION

Field of the Invention

The present invention relates to a DC-DC converter and a technique that detects output overcurrent to limit current flowing through the DC-DC converter.

Background Art

A DC-DC converter includes an overcurrent protection circuit to prevent high current from flowing through a switching element and breaking down the DC-DC converter. For a synchronous rectification type DC-DC converter, a method of detecting current in a switching element on the input terminal side or the ground terminal side to turn off the switching element is used.

As the current detection method, there is a method of converting, to voltage, current flowing through a switching element to compare the voltage with a reference value, or a method of comparing the drain-source voltage of the switching element with a reference voltage (for example, see Patent Document 1).

[Patent Document 1] Japanese Patent Application Laid-Open No. 2004-364488

SUMMARY OF THE INVENTION

In a conventional DC-DC converter including an overcurrent protection circuit, a current sense amplifier circuit and a comparator are always in operation to monitor a switching element.

An object of the present invention is to provide a DC-DC converter which is safe and secure, but yet with low power consumption.

According to one embodiment of the present invention, there is provided a DC-DC converter including: a switching element connected between one end of an inductor, which includes another end at which an output voltage is generated, and a input terminal of the DC-DC converter; an error amplifier that monitors output voltage; an output control circuit that outputs a control signal to the gate of a switching element based on an output signal of the error amplifier; and an overcurrent protection circuit that outputs a signal to the output control circuit when current flowing through the switching element becomes a predetermined current or higher to turn off the switching element, wherein a signal based on the output signal of the output control circuit is input to the overcurrent protection circuit so that the overcurrent protection circuit will perform intermittent operation to operate only for a predetermined period of time.

In the DC-DC converter of the present invention, since the overcurrent protection circuit operates intermittently, the current consumption under light load can be particularly reduced, and hence power efficiency can be improved.

DETAILED DESCRIPTION OF THE PREFERRED EMBODIMENTS

Embodiments of the present invention will be described below with reference to the accompanying drawings.

Figure 1:
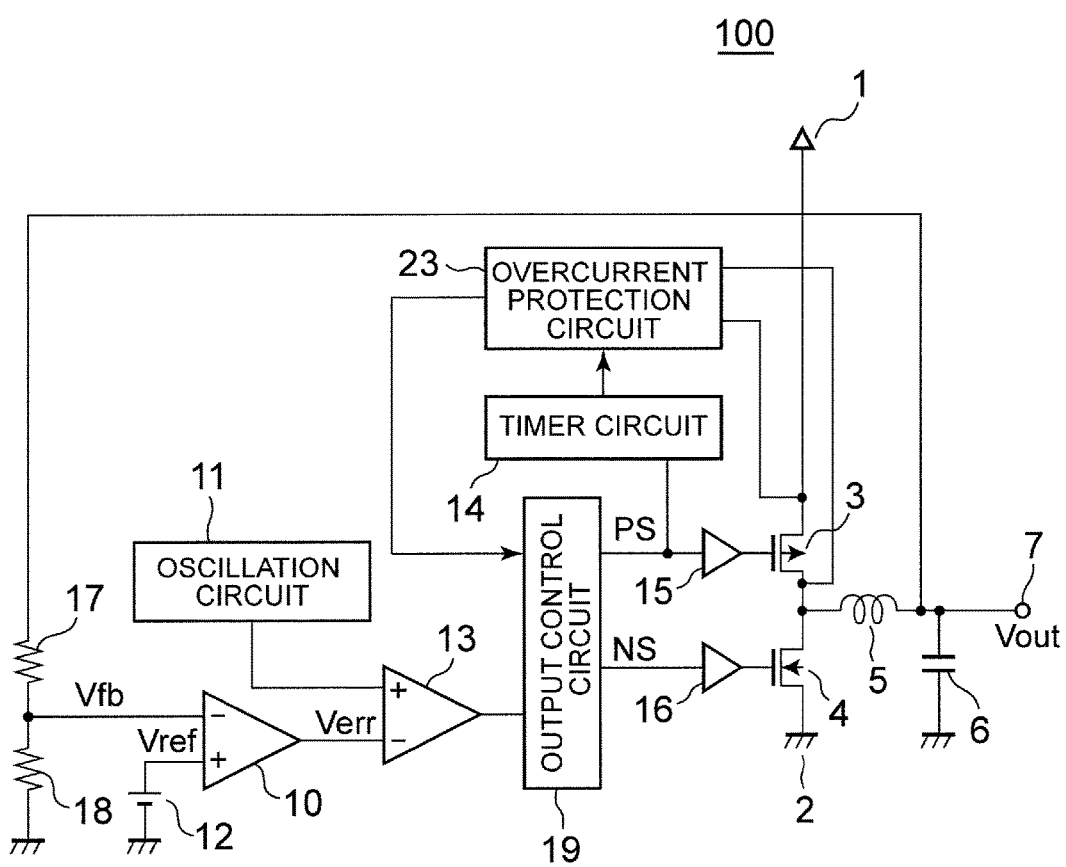
FIG. 1 is a circuit diagram illustrating a DC-DC converter of a first embodiment of the present invention.

FIG. 1 is a circuit diagram illustrating a DC-DC converter of a first embodiment of the present invention. A DC-DC converter 100 is a synchronous rectification type DC-DC converter that converts supply voltage Vin input to an input terminal 1 into constant voltage, and outputs the voltage to an output terminal 7 as output voltage Vout.

The DC-DC converter 100 of the embodiment includes a PMOS transistor 3 as a first switching element, an NMOS transistor 4 as a second switching element, an inductor 5, an output capacitor 6, an error amplifier 10, an oscillation circuit 11, a reference voltage circuit 12, a comparator 13, a timer circuit 14, buffer circuits 15 and 16, voltage-dividing resistors 17 and 18, an output control circuit 19, and an overcurrent protection circuit 23.

The voltage-dividing resistors 17 and 18 output feedback voltage Vfb corresponding to the output voltage Vout. The error amplifier 10 outputs voltage Verr corresponding to a voltage difference between the feedback voltage Vfb and an output voltage Vref of the reference voltage circuit 12. The comparator 13 compares a triangle wave output from the oscillation circuit 11 and the voltage Verr of the error amplifier 10. The output control circuit 19 outputs a signal PS to the PMOS transistor 3 and a signal NS to the NMOS transistor 4 according to the comparison result of the comparator 13 to control switching operation.

The overcurrent protection circuit 23 monitors current flowing through the PMOS transistor 3, and outputs a signal to the output control circuit 19 to turn off the PMOS transistor 3 when overcurrent is detected.

The timer circuit 14 outputs a start signal to the overcurrent protection circuit 23 in response to a signal to turn on the PMOS transistor 3, and outputs a stop signal to the overcurrent protection circuit 23 after a lapse of a predetermined period of time.

Figure 2:
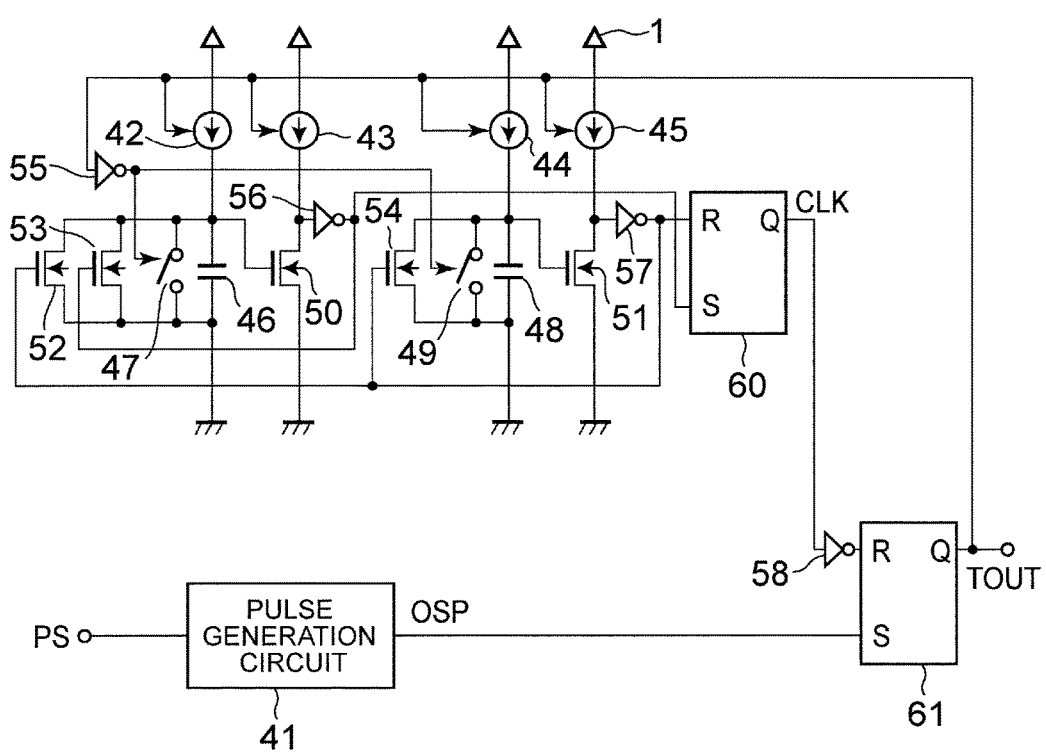
FIG. 2 is a circuit diagram illustrating an example of a timer circuit in the DC-DC converter of the first embodiment.

FIG. 2 is a circuit diagram illustrating an example of the timer circuit 14.

A pulse generation circuit 41 outputs a one-shot pulse (signal OSP) in response to the signal PS input to an IN terminal. In other words, when the signal PS (L level) t9 to turn on the PMOS transistor 3 is input from the output control circuit 19, a predetermined period of an L signal is output.

Bias circuits 42, 43, 44, and 45 are turned on in response to an H signal output from an RS-FF circuit 61 to output current based on the input voltage Vin applied to the input terminal 1.

A capacitor 46 is connected to the output of the bias circuit 42, and charged by the current of the bias circuit 42. A capacitor 48 is connected to the output of the bias circuit 44, and charged by the current of the bias circuit 44. The capacity of the capacitor 48 is higher than that of the capacitor 46. When the charging current is the same, the charging time of the capacitor 48 to reach a predetermined voltage is longer than that of the capacitor 46.

An NMOS transistor 50 is turned on when the voltage of the capacitor 46 becomes a threshold voltage or higher. An inverter 56 outputs the H or L signal to a set terminal S of the RS-FF circuit 60 and the gate of an NMOS transistor 53 in response to on/off of the NMOS transistor 50.

An NMOS transistor 51 is turned on when the voltage of the capacitor 48 becomes a threshold voltage or higher. An inverter 57 outputs the H or L signal to a reset terminal R of the RS-FF circuit 60 and the gates of NMOS transistors 52, 54 in response to on/off of the NMOS transistor 51.

NMOS transistors 52, 53 are connected in parallel with the capacitor 46, and turned on when the H signal is input to the gates thereof to discharge the electric charge of the capacitor 46. The NMOS transistor 54 is connected in parallel with the capacitor 48, and turned on when the H signal is input to the gate thereof to discharge the electric charge of the capacitor 48.

An inverter 55 outputs, to switches 47, 49, a signal obtained by inverting a signal TOUT output from an output terminal Q of the RS-FF circuit 61. The switch 47 is connected in parallel with the capacitor 46, and turned on in response to the L signal output from the RS-FF circuit 61 through the inverter 55 to discharge the electric charge of the capacitor 46. The switch 49 is connected in parallel with the capacitor 48, and turned on in response to the L signal output from the RS-FF circuit 61 through the inverter 55 to discharge the electric charge of the capacitor 48.

The RS-FF circuit 60 outputs a signal CLK from a Q terminal based on the signals input to the set terminal S and the reset terminal R. The signal OSP of the pulse generation circuit 41 is input to the set terminal S of the RS-FF circuit 61, and the signal CLK output from the RS-FF circuit 60 is input to the reset terminal R to output the signal TOUT from the output terminal Q.

The timer circuit 14 thus configured outputs a signal to turn on the overcurrent protection circuit 23 only for a predetermined period of time in response to the signal PS to turn on the PMOS transistor 3.

Note that the timer circuit 14 is not limited to this circuit example, and it may be any circuit as long as the circuit starts operation when a trigger signal is input and ends the operation when a timer set time has passed. Note further that such a timer circuit starts recounting anew from an initial value when the trigger signal is input in the middle of the operation.

Figure 3:
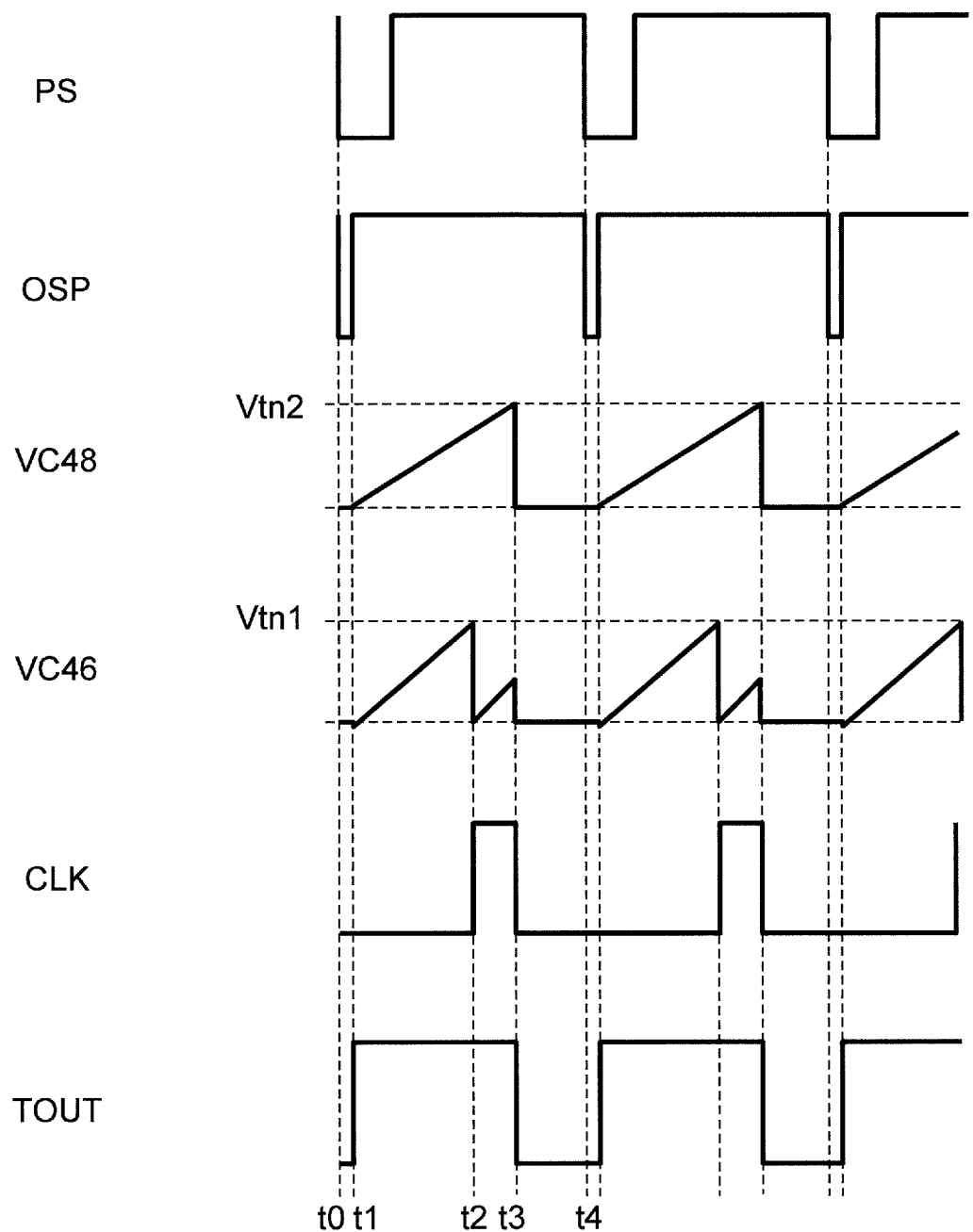
FIG. 3 is a timing chart illustrating the operation of the timer circuit in the DC-DC converter of the first embodiment.

Referring next to a timing chart of FIG. 3, the operation of the timer circuit 14 will be described.

At time t0, when the output signal of the output control circuit 19 is input to the IN terminal of the timer circuit 14, the pulse generation circuit 41 outputs an L signal pulse. At this time, the capacitors 46, 48 are discharged, and the charging voltage is L.

At time t1, the H signal is output from the pulse generation circuit 41, and input to the set terminal S of the RS-FF circuit 61. Therefore, the H signal output from the RS-FF circuit 61 turns on the bias circuits 42, 43, 44, and 45 to start the supply of current so as to charge the capacitors 46, 48. Simultaneously, the H signal output from the RS-FF circuit 61 is inverted by the inverter 55 so that the switches 47, 49 will be turned off by the L signal.

At time t2, when the charging voltage of the capacitor 46 reaches a threshold voltage Vtn1 of the NMOS transistor 50 by the current supplied from the bias circuit 42, the NMOS transistor 50 is turned on to output the L signal. This L signal is converted by the inverter 56 to the H signal, and the H signal is input to the set terminal S of the RS-FF circuit 60. Thus, the H signal is output from the output terminal Q of the RS-FF circuit 60. The output signal is inverted by the inverter 58, and input to the reset terminal R of the RS-FF circuit 61. Then, the H signal continues to be output from the OUT terminal. Simultaneously, the H signal output from the inverter 56 turns on the NMOS transistor 53 to discharge the capacitor 46. Since the charging voltage of the capacitor 48 larger in capacity value than the capacitor 46 does not reach a threshold voltage Vtn2 of the NMOS transistor 51, charging is continued.

At time t3, when the charging voltage of the capacitor 48 reaches the threshold voltage Vtn2 of the NMOS transistor 51, the NMOS transistor 51 is turned on to output the L signal. This L signal is converted by the inverter 57 to the H signal, and the H signal is input to the reset terminal R of the RS-FF circuit 60. On the other hand, the H signal output from the inverter 57 turns on the NMOS transistors 52, 54 to discharge the capacitors 46, 48. At this time, since the NMOS transistor 50 is off, the H signal is output, and the L signal is input to the set terminal S of the RS-FF circuit 60 through the inverter 56. The RS-FF circuit 60 with the L signal input to the set terminal S and the H signal input to the reset terminal R outputs the L signal from the output terminal Q. This L signal is input as the H signal to the reset terminal R through the inverter 58, and the RS-FF circuit 61 outputs the L signal.

At time t4, the output signal of the output control circuit 19 is input to the IN terminal of the timer circuit 14, and the pulse generation circuit 41 outputs the L signal pulse. The RS-FF circuit 61 outputs the H signal when the L signal pulse rises.

As described above, the timer circuit 14 outputs the H signal when the PMOS transistor 3 is turned on to start time counting so as to output an intermittent signal of the output cycle of the L signal after the counting period. This counting period can be set based on the capacity value of the capacitor 48, the current value of the bias circuit 44, and the threshold voltage of the NMOS transistor 51.

In this example, the counting period is set shorter than the switching cycle of the PMOS transistor 3. If the counting period is set longer than the switching cycle, since the signal to turn on the PMOS transistor 3 is input before reaching the counting period to start time counting again, the timer circuit 14 will continue to output the H signal.

Thus, the relationship between the counting period and the switching cycle can be adjusted to select either intermittent output or constant output depending on the situation.

Figure 4:
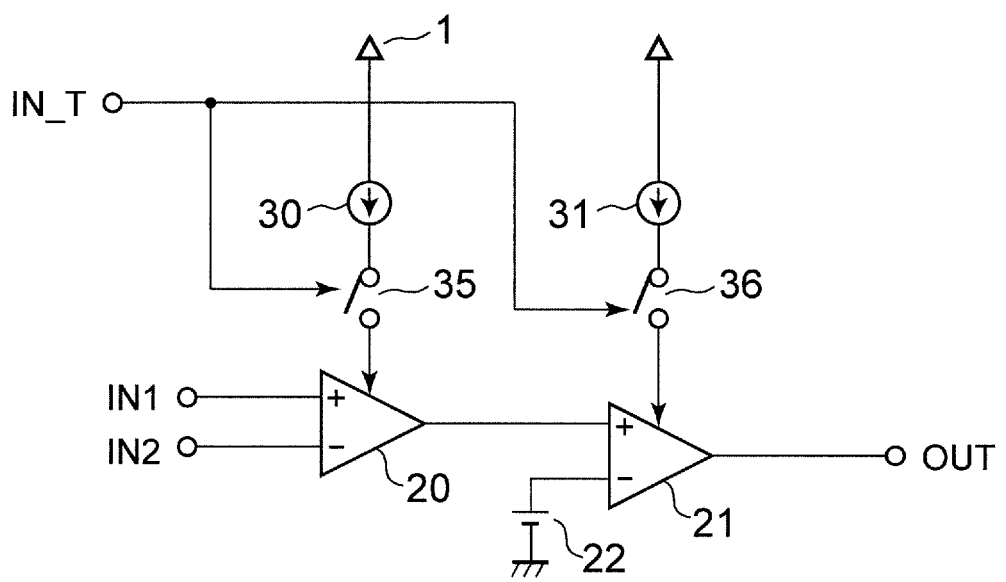
FIG. 4 is a circuit diagram illustrating an example of an overcurrent protection circuit in the DC-DC converter of the first embodiment.

FIG. 4 is a diagram illustrating a circuit example of the overcurrent protection circuit of the first embodiment of the present invention. The overcurrent protection circuit 23 includes a current sense amplifier 20 that converts, to voltage, current flowing through the PMOS transistor 3, a comparator 21 that latches the output signal, bias circuits 30, 31, and a reference voltage circuit 22. The overcurrent protection circuit 23 also includes a switch 35 that controls the supply of current from the bias circuit 30 to the current sense amplifier 20, and a switch 36 that controls the supply of current from the bias circuit 31 to the comparator 21.

When the H signal is input from the timer circuit 14 to an IN_T terminal, the switches 35, 36 are turned on, and current is supplied to the current sense amplifier 20 and the comparator 21. The current sense amplifier 20 receives, at IN1, IN2 terminals, current flowing through the PMOS transistor 3 to output voltage corresponding to the current flowing through the PMOS transistor 3. The comparator 21 compares the output of the current sense amplifier 20 with a reference voltage output from the reference voltage circuit 22 to determine the current flowing through the PMOS transistor 3.

When the output voltage of the current sense amplifier 20 is the reference voltage value or higher, the comparator 21 determines an overcurrent state and outputs the H signal from an OUT terminal. Then, the PMOS transistor 3 is turned off during the switching cycle to prevent a breakdown of the DC-DC converter 100. Then, the switches 35, 36 perform on/off operation based on the signal input to the IN_T When the switches 35, 36 are off, the current sense amplifier 20 and the comparator 21 latch the signals when the switches are on to avoid an unstable state. A determination level to determine whether the current of the PMOS transistor 3 is overcurrent or not can be decided arbitrarily based on the reference voltage value of the reference voltage circuit 22.

The DC-DC converter of the present invention using the timer circuit 14 and the overcurrent protection circuit 23 described above can change the relationship between the counting period and the switching cycle to control intermittent operation.

For example, when the counting period is set longer than the switching cycle, the overcurrent protection circuit 23 is switched between the intermittent operation and always-on operation depending on the load connected to the output terminal 7.

When the load is heavy, the PMOS transistor 3 takes the state of a continuous operation mode to perform oscillation operation in a given switching cycle. Therefore, even when starting time counting in response to the signal from the output control circuit 19, the timer circuit 14 receives the signal from the output control circuit 19 again before a given counting period. As a result, the timer circuit 14 continues to output the on signal so that the overcurrent protection circuit 23 will not perform the intermittent operation.

When the load is light, the fluctuation of the output voltage Vout is small. Therefore, the operation of the PMOS transistor 3 shifts into the state of a discontinuous operation mode not to perform oscillation operation of the given cycle, resulting in a decrease in frequency. Then, when the switching cycle exceeds the counting period, the timer circuit 14 outputs an on/off signal to cause the overcurrent protection circuit 23 to perform the intermittent operation. Thus, the power consumption of the overcurrent protection circuit 23 can be reduced.

On the other hand, when the counting period of the timer circuit 14 is set shorter than the switching cycle, the overcurrent protection circuit 23 performs the intermittent operation regardless of the load connected to the output terminal 7. Thus, the power consumption can further be reduced.

In the above description, the time counting by the timer circuit 14 is started simultaneously with the time when the PMOS transistor 3 is turned on, but the timer circuit 14 may be started simultaneously with the time when the PMOS transistor 3 is turned off.

The overcurrent protection circuit 23 is described as a circuit in which the current sense amplifier 20 converts the current flowing through the PMOS transistor 3 to the voltage corresponding to the current value, and the comparator 21 compares the voltage with the output voltage of the reference voltage circuit 22 to determine the overcurrent state, but the overcurrent protection circuit 23 may be such a circuit to monitor the drain-source voltage of the PMOS transistor 3 so that the comparator will compare the voltage with the reference voltage to determine the overcurrent state.

Figure 5:
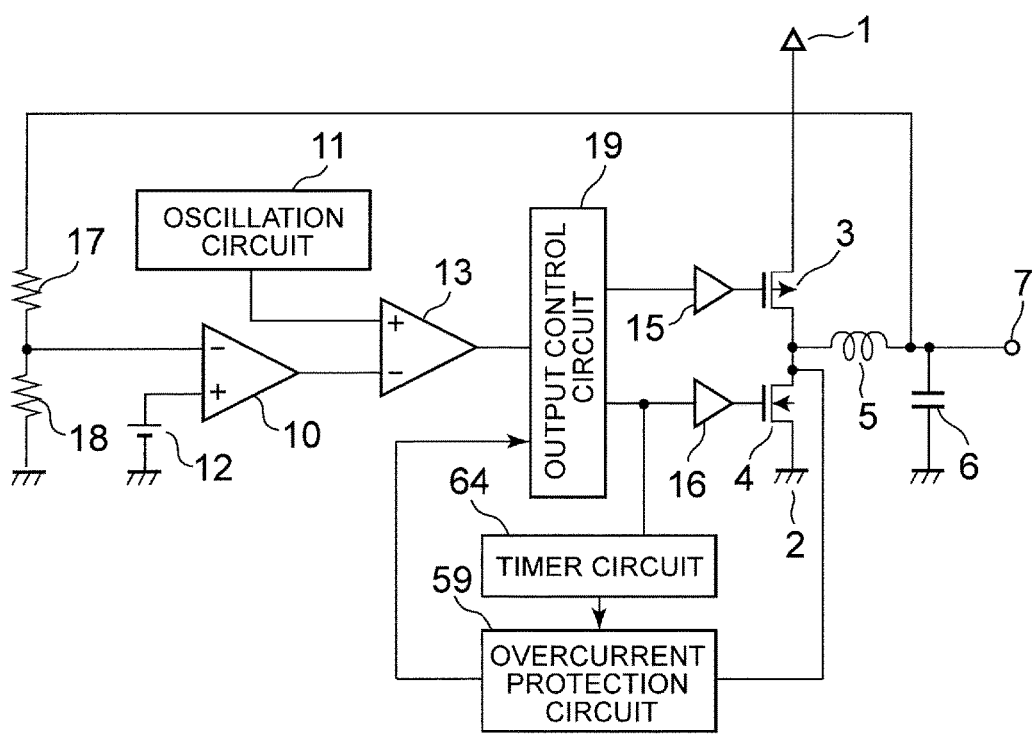
FIG. 5 is a circuit diagram illustrating a DC-DC converter of a second embodiment of the present invention.

FIG. 5 is a circuit diagram illustrating a DC-DC converter of a second embodiment. A DC-DC converter 200 includes an overcurrent protection circuit 59 and a timer circuit 64. The overcurrent protection circuit 59 monitors current through the NMOS transistor 4.

The timer circuit 64 outputs a start signal to the overcurrent protection circuit 59 in response to a signal to turn on the NMOS transistor 4, and outputs a stop signal to the overcurrent protection circuit 59 after a lapse of a predetermined period of time.

Figure 6:
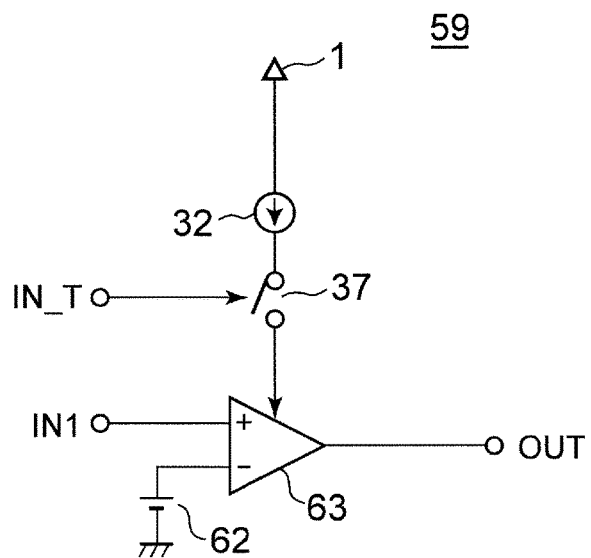
FIG. 6 is a circuit diagram illustrating an example of an overcurrent protection circuit of the second embodiment of the present invention.

FIG. 6 is a circuit diagram illustrating an example of the overcurrent protection circuit 59. The overcurrent protection circuit 59 includes a comparator 63 that latches an output signal, a bias circuit 32, a switch 37 that controls the supply of current from the bias circuit 32 to the comparator 63, and a reference voltage circuit 62.

When the H signal is input from the timer circuit 64 to the IN_T terminal, the switch 37 is turned on to supply current to the comparator 63. The comparator 63 receives, at the IN1 terminal, the drain voltage of the NMOS transistor 4, compares the voltage with a reference potential output from the reference voltage circuit 62, and outputs a signal corresponding to a difference therebetween. The comparator 63 compares the drain voltage of the NMOS transistor 4 with the reference voltage output from the reference voltage circuit 62 to determine current flowing through the NMOS transistor 4.

When the input voltage at the IN1 terminal is the reference voltage value or higher, the comparator 63 determines an overcurrent state and outputs the H signal from the OUT terminal. When the input voltage at the IN1 terminal becomes lower than the reference voltage value, the comparator 63 outputs the L signal from the OUT terminal. Then, the switch 37 performs on/off operation based on the signal input to the IN_T terminal. When the switch 37 is off, the comparator 63 latches the signal when the switch is on to avoid an unstable state. A determination level to determine whether the current of the NMOS transistor 4 is overcurrent or not can be decided arbitrarily based on the reference voltage value of the reference voltage circuit 62.

The DC-DC converter of the present invention using the timer circuit 64 and the overcurrent protection circuit 59 described above can change the relationship between the counting period and the switching cycle to control intermittent operation.

For example, when the counting period is set longer than the switching cycle, the overcurrent protection circuit 59 is switched between the intermittent operation and always-on operation depending on the load connected to the output terminal 7.

When the load is heavy, the NMOS transistor 4 takes the state of a continuous operation mode to perform oscillation operation before a given switching cycle. Therefore, even when starting time counting in response to the signal from the output control circuit 19, the timer circuit 64 receives the signal from the output control circuit 19 again before the given counting period. As a result, the timer circuit 64 continues to output the on signal so that the overcurrent protection circuit 59 will not become the intermittent operation state.

When the load is light, the fluctuation of the output voltage Vout is small. Therefore, the operation of the NMOS transistor 4 shifts into the state of a discontinuous operation mode not to perform oscillation operation of the given cycle, resulting in a decrease in frequency. Then, when the switching cycle exceeds the counting period, the timer circuit 64 outputs an on/off signal to cause the overcurrent protection circuit 59 to perform the intermittent operation. Thus, the power consumption of the overcurrent protection circuit 59 can be reduced.

When it is determined that the overcurrent protection circuit 59 is in an overcurrent state, the overcurrent protection circuit 59 continues to operate until completion of the counting by the timer circuit 64 to protect the DC-DC converter from the overcurrent. To this end, it is necessary to set the counting period of the timer circuit 64 to be long enough to reduce the current value to a certain value or smaller.

The operation of the overcurrent protection circuit 59 may also be synchronized with the timing of turning on the NMOS transistor 4 without using the timer circuit 64. In this case, the overcurrent protection circuit 59 detects current only when the NMOS transistor 4 is in the on state to operate intermittently. Further, the operation period of the overcurrent protection circuit 59 is not limited by the counting period of the timer circuit 64.

An equivalent effect can be obtained even when the operation period of the overcurrent protection circuit 59 is a certain period of time after the PMOS transistor 3 is turned on, rather than the certain period of time after the NMOS transistor 4 is turned on.

What is claimed is:

1. A DC-DC converter, comprising:
   a switching element connected between a first end of an inductor and an input terminal of the DC-DC converter, the inductor having a second end connected to an output terminal;
   an error amplifier that monitors the output voltage;
   an output control circuit that outputs a control signal to a gate of the switching element based on an output signal of the error amplifier to establish a switching cycle;
   an overcurrent protection circuit that includes a comparator driven by a switch-connected bias circuit and that outputs a first signal to the output control circuit when current flowing through the switching element is a predetermined current or higher to turn off the switching element; and
   a timer circuit configured to operate for a set counting period when the switching element is on and to output a second signal to the overcurrent protection circuit,
   wherein the second signal is based on the control signal of the output control circuit and controls the switch-connected bias circuit, such that the overcurrent protection circuit operates intermittently and only for a predetermined period of time during the counting period.

2. The DC-DC converter according to claim 1, wherein the timer circuit outputs a third signal to cause the overcurrent protection circuit to operate intermittently based on the control signal of the output control circuit.

* * * * *